April 5, 1949.    H. B. SCHULTZ    2,466,485
VALVE
Filed March 11, 1944
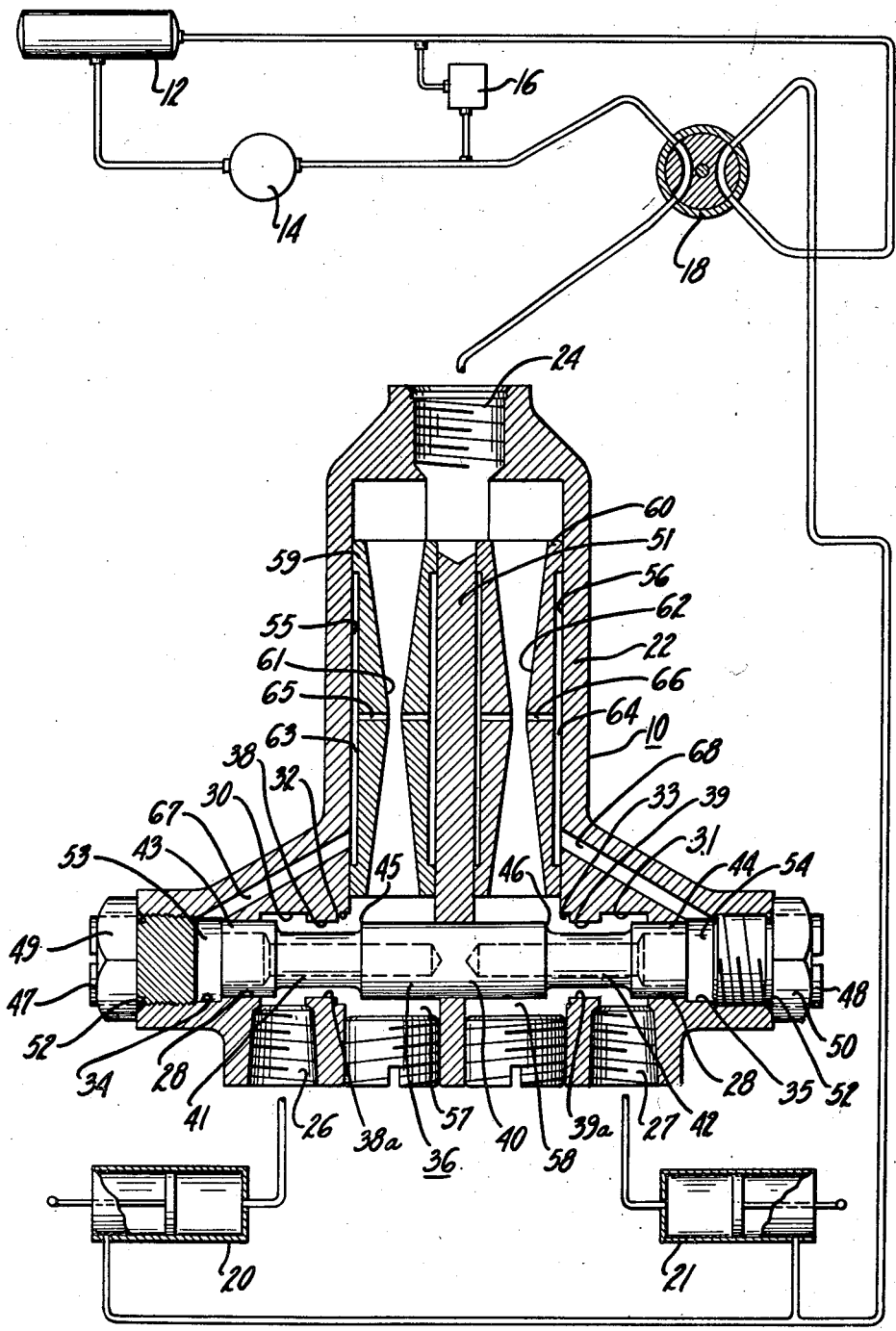
INVENTOR
HAROLD B. SCHULTZ
BY Cecil & Arens
ATTORNEY Patented Apr. 5, 1949

2,466,485

UNITED STATES PATENT OFFICE 2,466,485

VALVE

Harold B. Schultz, South Bend, Ind., assignor to Bendix Aviation Corporation, South Bend, Ind., a corporation of Delaware Application March 11, 1944, Serial No. 525,987

4 Claims. (Cl. 137—166)

This invention relates to valves for controlling the flow of fluid, and more particularly to that type of valve adapted to operate a plurality of outlets through a single inlet where it is desirable to divide the flow equally between the outlets.

In many hydraulic systems two or more fluid motor units or other fluid actuated devices are intended to be operated simultaneously with equal movement, as for example, the wing flaps or the landing gears of an aircraft. It is not uncommon during the extending operation of landing gear to have one of the landing gear offer a greater resistance to movement than the other, in which case the one offering the least resistance to movement will reach an extended position prior to the one offering the greater resistance. Where such a condition prevails, the aerodynamic balance of the aircraft is destroyed.

Therefore, it is one of the objects of this invention to provide a valve which will equalize the flow to the fluid actuated devices to which it is connected regardless of the varying resistance offered to the flow of fluid by the devices which are to be simultaneously moved.

It is an object of the invention to provide means in a hydraulic system for maintaining constant volumetric flow to the motors of the system which are connected in parallel through an equalizer valve, irrespective of the varying work resistances offered by the motors to the flow.

Another object of the invention resides in the provision of a valve which will equalize the flow therethrough in either direction.

A still further object of the invention is to provide a valve for equalizing the flow of fluid which may be manufactured more economically than similar valves have been manufactured heretofore.

Still other objects and advantages of this invention will be apparent from a consideration of the following detailed description, taken in connection with the accompanying drawing, which is for purposes of illustration only, and not intended to define the scope of the invention.

The single figure shows the valve of the invention incorporated into a hydraulic system adapted to supply fluid under pressure to a pair of fluid motors.

Referring to the drawing, the reference numeral 10 designates the valve of this invention connected to a hydraulic system comprising a reservoir 12, a pump 14, relief valve 16, four-way valve 18 and fluid motors 20 and 21 which may operate sundry devices such as wing flaps, landing gear and the like. Valve 18 is a conventional type four-way valve and is so constructed that the direction of flow through valve 10 is controlled by selective operation of the former.

The flow control valve 10 is adapted to equalize the flow of fluid to motor units 20 and 21 and comprises a body member 22 having an inlet 24 and cylinder ports 26 and 27. The body 22 has therein a bore 28, recessed at 30, 31, 32 and 33 and counterbored at 34 and 35 to receive a spool valve or plunger 36 which is designed to cooperate with annulated portions 38 and 39 formed in the bore 28.

The valve spool or plunger 36 has an enlarged central portion 40, reduced portions 41 and 42 and enlarged end portions 43 and 44 adapted to slide in the bore 28 which provides a bearing means for said valve. The reduced portions 41 and 42 of the plunger are coextensive with the annulated portions 38 and 39 respectively of the bore to permit the passage of fluid to the cylinder ports at a time when the spool valve is in the position shown, for example. The annulated portions 38 and 39 form valve lands 38a and 39a respectively, which are constructed to cooperate with shoulders 45 and 46 of the enlarged central portion 40 of the valve to diminish the flow to one of the cylinder ports and increase the flow to the other port when the valve is shifted in the bore.

For limiting the axial shift of the valve in bore 28 and to prevent the shoulders 45 and 46 of the enlarged portion 40 of the plunger from lapping the valve lands 38a and 39a to thereby prevent complete interruption of the flow to the cylinder ports 26 and 27 respectively, adjusting plugs 47 and 48 are disposed in each end of the bore and locked in position by lock nuts 49 and 50. Sealing elements 52 circumscribe the plugs 47 and 48 and furnish a seal from atmosphere for cavities 53 and 54 formed in the ends of the bore 28. The enlarged ends 43 and 44 of the spool valve form movable walls for the cavities 53 and 54 respectively.

Parallel bores 55 and 56 connect the inlet 24 to the bore 28. A wall or partition 51, formed by the bores 55 and 56 divides bore 28 into two compartments 57 and 58 which communicate with the cylinder ports 26 and 27 respectively. Venturi tubes 59 and 60 are secured in the bores 55 and 56 in any suitable manner such as by press fitting the tubes into the bore. The Venturi tubes 59 and 60 have restricted passages or throat portions 61 and 62 which are connected to exteriorly recessed portions 63 and 64 by passages 65 and 66. Passages 67 and 68 establish communication between the cavities 53 and 54 and the exteriorly recessed portions 63 and 64 respectively to thereby complete the hydraulic connection to the Venturi throats for communicating the pressure in the Venturi throats to the cavities 53 and 54. With communication established between opposite ends of the bore and restricted passages 61 and 62 any change in pressure in the restricted passages will reflect a similar change in pressure in the ends of the bore or cavities.

Operation of the valve is as follows:

Under conditions where the fluid motors offer equal resistance to flow the motors will be moved coinstantaneously and the pressures acting in the opposite ends of the bore on the plunger will be equal, since the flow will be equal and the valve will be in a central balanced position, as shown in the figure. That is, the valve spool will be centrally positioned in the bore and divide the flow to the cylinder ports equally.

However, at an instant of time when the motor unit 21 on the right, for example, offers a greater resistance to the flow of fluid than the motor unit 20 on the left, the flow at that instant through the restricted passage 62 on the right will be decreased and the flow through the restricted passage 61 on the left will increase. At this instant there is, of course, an unbalanced flow through the restricted passages. These differences in flow past the passages 61 and 62 which communicate with the cavities adjacent the ends of the plunger, create a pressure differential acting on the ends of the plunger to thereby shift the same to restrict the flow in the restricted passage on the left and increase the flow in the restricted passage on the right. That is, due to the decrease in flow in the right venturi plunger 36 has its right end, which is adjacent the right cavity 54, subjected to a greater pressure, and since the flow through the left venturi has increased the pressure acting on the left end of the plunger adjacent the left cavity 53 will have decreased and the pressure differential which results will act on the right end of the plunger to shift said plunger to the left until the rate of fluid flow through the two venturis become equal and the pressures in the cavities have again become balanced. The flow past the Venturi throats will now be such that concurrent movement of the fluid motors will be obtained. This will be true independent of the variance in resistance offered to flow by the motor units.

Where the flow through the valve is in the opposite direction, that is, where the fluid exhausted from the motors 20 and 21 is returned to the system via valve 10 the action of the valve spool is identical with the movement above.

From the foregoing description it will be seen that I have provided a novel flow equalizer valve for hydraulic systems which may be adapted for a variety of uses and which presents marked advantages over constructions heretofore manufactured.

Now having described my invention, I claim:

1. A valve for equalizing the flow of fluid comprising a body member having an inlet port and cylinder ports therein, a bore in said body member interconnecting said cylinder ports, Venturi-shaped passages each having a throat portion connecting respectively each of said cylinder ports to said inlet port through said bore, a plunger arranged in the bore to form therewith oppositely disposed chambers, said plunger being slidable in the bore and having ends so constituted to provide movable walls one for each chamber, passages respectively connecting the throat portions to the chambers, the areas of the throat portions at the junction of the connecting passages being equal and the areas of the movable walls being equal, and means in said bore including the plunger so constructed and arranged that differences in pressure between the chambers acting on the movable walls is effective to control the flow of fluid to the cylinder ports in a manner to thereby equalize the pressure in the chambers.

2. A valve for equalizing the flow of fluid comprising a body member having an inlet port and cylinder ports therein, a bore in said body member interconnecting said cylinder ports and having valve lands disposed therein adjacent said cylinder ports, Venturi passages including Venturi throats of equal areas respectively connecting said inlet port to said cylinder ports through said bore, passages respectively connecting the ends of the bore to said Venturi throats, and a plunger having ends of equal areas slidably disposed in said bore and constructed and arranged to cooperate with said valve lands to control the flow of fluid to the cylinder ports, said plunger constituted to respond to difference in pressure between the ends of the bore and acting on the ends of the plunger, to slide the same in the bore so as to equalize the flow of fluid to the cylinder ports and to establish a balance in the pressures existing at the ends of the bore.

3. A valve for equalizing the flow of fluid comprising a body member having an inlet port and cylinder ports therein, a bore in said body member interconnecting said cylinder ports and having valve lands therein adjacent said cylinder ports and an annulated portion centrally disposed in said bore and forming a wall in said bore between said cylinder ports, Venturi passages including Venturi throats of equal areas respectively connecting said inlet port with said cylinder ports, passages respectively connecting the ends of the bore to said Venturi throats, and a plunger having ends of equal areas, slidably disposed in said bore and said annulated portion and constructed and arranged to cooperate with said valve lands to control the flow of fluid to the cylinder ports, said plunger constituted to respond to difference in pressure between the ends of the bore and acting on the ends of the plunger, to slide the same in the bore to thereby equalize the flow of fluid to the cylinder ports and to establish a balance in the pressures existing at the end of the bore.

4. A valve for equalizing the flow of fluid comprising a body member having an inlet port and cylinder ports therein, a bore in said body member interconnecting said cylinder ports, Venturi passages having throats of equal areas respectively connecting said cylinder ports to said inlet port through said bore, passages respectively connecting the throats to the ends of the bore, a plunger shiftable in said bore and having ends of equal areas, and means in said bore including the plunger so constructed and arranged that the difference in pressure between the ends of the plunger is effective to control the flow of fluid from the inlet port to the cylinder ports in a manner to restore said difference in pressure to zero, the pressure in the ends of the bore acting on the ends of the plunger being equal so long as the flow in the throats is equal, and unequal when the flow in the throats becomes unequal, whereby said plunger is shifted to a position tending to equalize the flow at the cylinder ports independent of variations in pressure at the cylinder ports.

HAROLD B. SCHULTZ.

REFERENCES CITED

The following references are of record in the file of this patent:

UNITED STATES PATENTS

| Number | Name | Date |
| --- | --- | --- |
| 2,266,921 | Trautman | Dec. 23, 1941 |

FOREIGN PATENTS

| Number | Country | Date |
| --- | --- | --- |
| 843,621 | France | 1939 |